Figure 1:
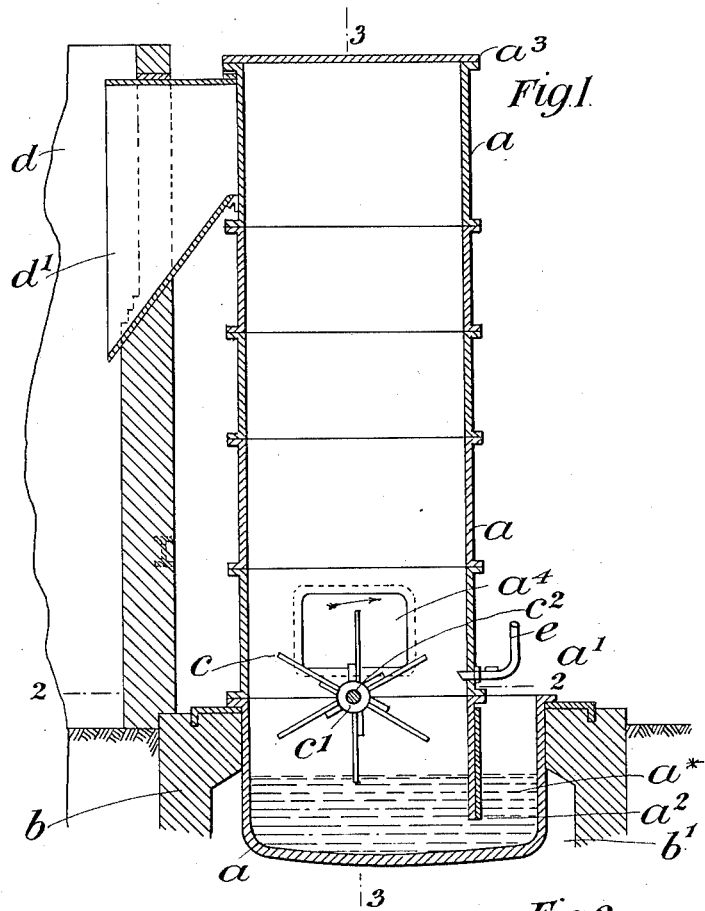

W. INNES.
APPARATUS FOR PRODUCING LEAD OXID.
APPLICATION FILED APR. 19, 1913.

1,113,123.

Patented Oct. 6, 1914.
10 SHEETS—SHEET 1.

WITNESSES:
John C. Sanders
H. B. Cottrell

INVENTOR:
William Innes
BY Wm. Wallace White
ATTY

W. INNES.
APPARATUS FOR PRODUCING LEAD OXID.
APPLICATION FILED APR. 19, 1913.
1,113,123.
Patented Oct. 6, 1914
10 SHEETS—SHEET 2.
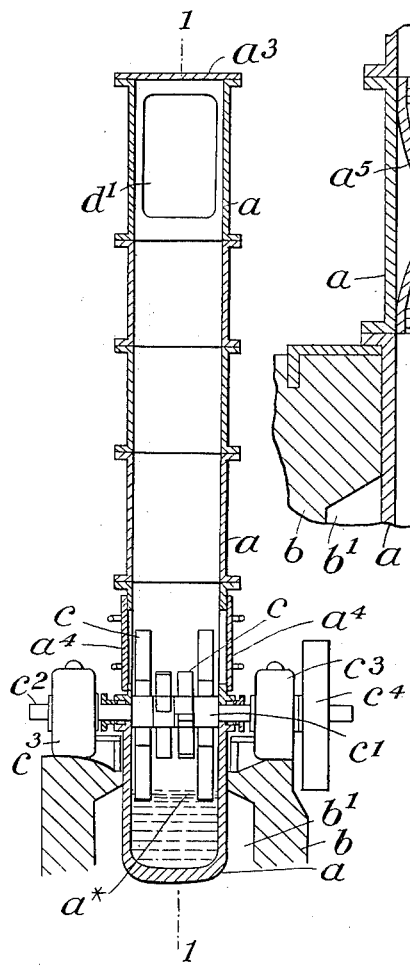
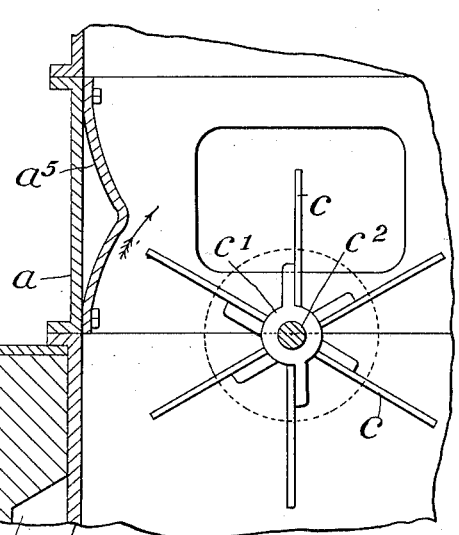

W. INNES.
APPARATUS FOR PRODUCING LEAD OXID.
APPLICATION FILED APR. 19, 1913.
1,113,123. Patented Oct. 6, 1914.
10 SHEETS—SHEET 3.
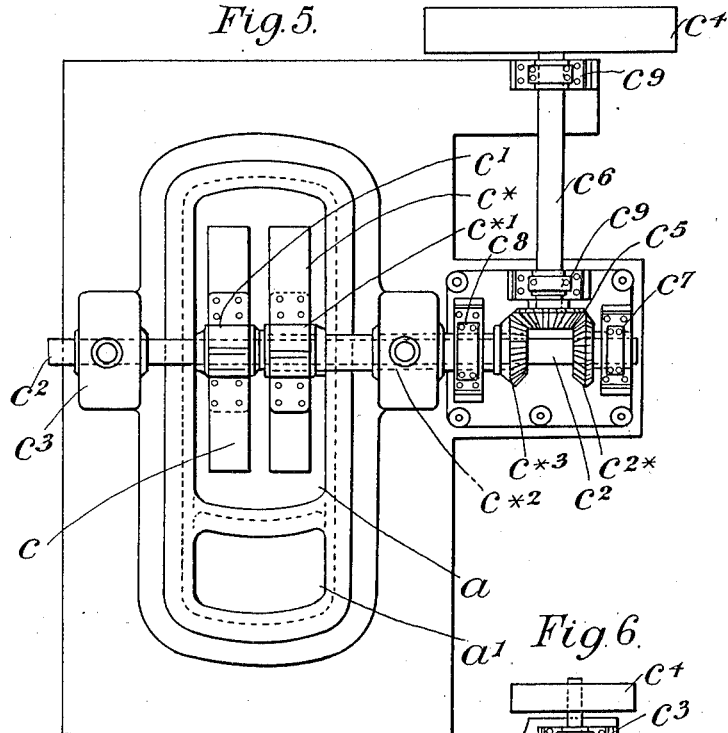
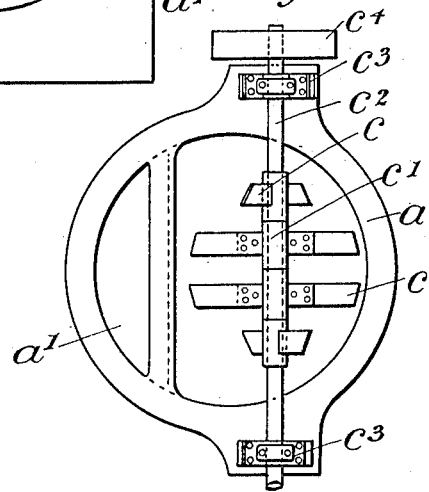

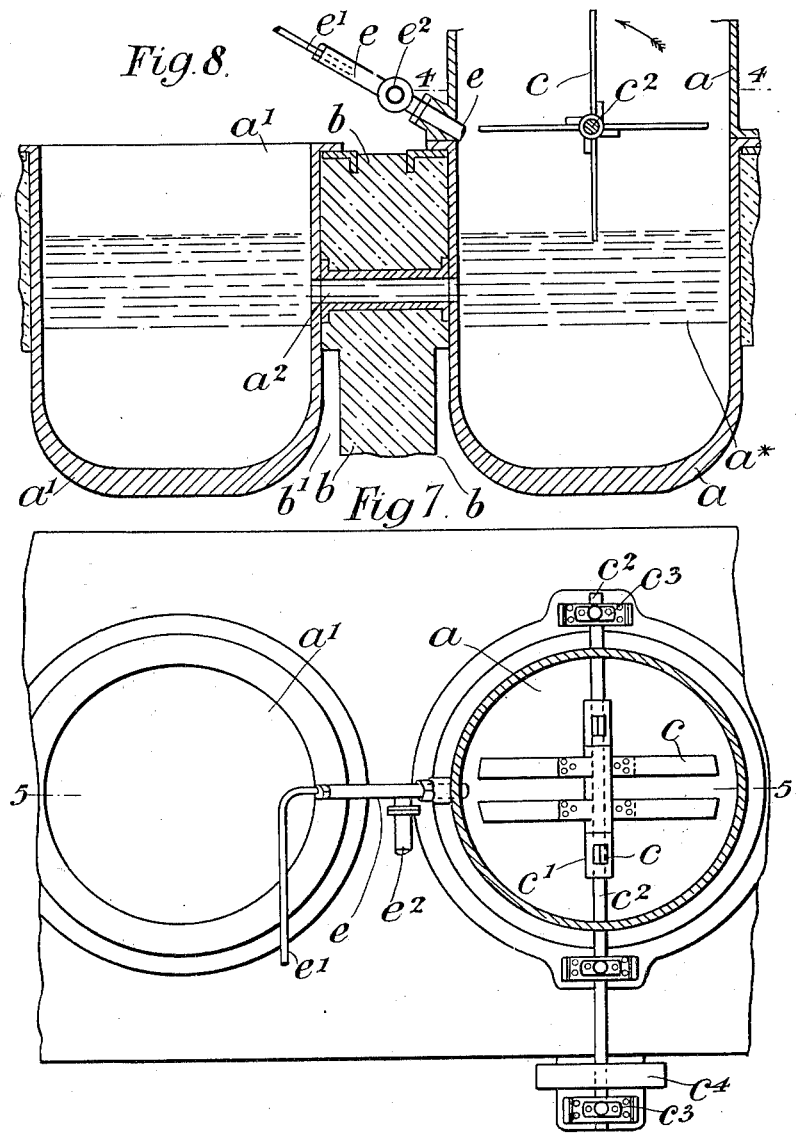

W. INNES.
APPARATUS FOR PRODUCING LEAD OXID.
APPLICATION FILED APR. 19, 1913.
1,113,123.
Patented Oct. 6, 1914.
10 SHEETS—SHEET 5.
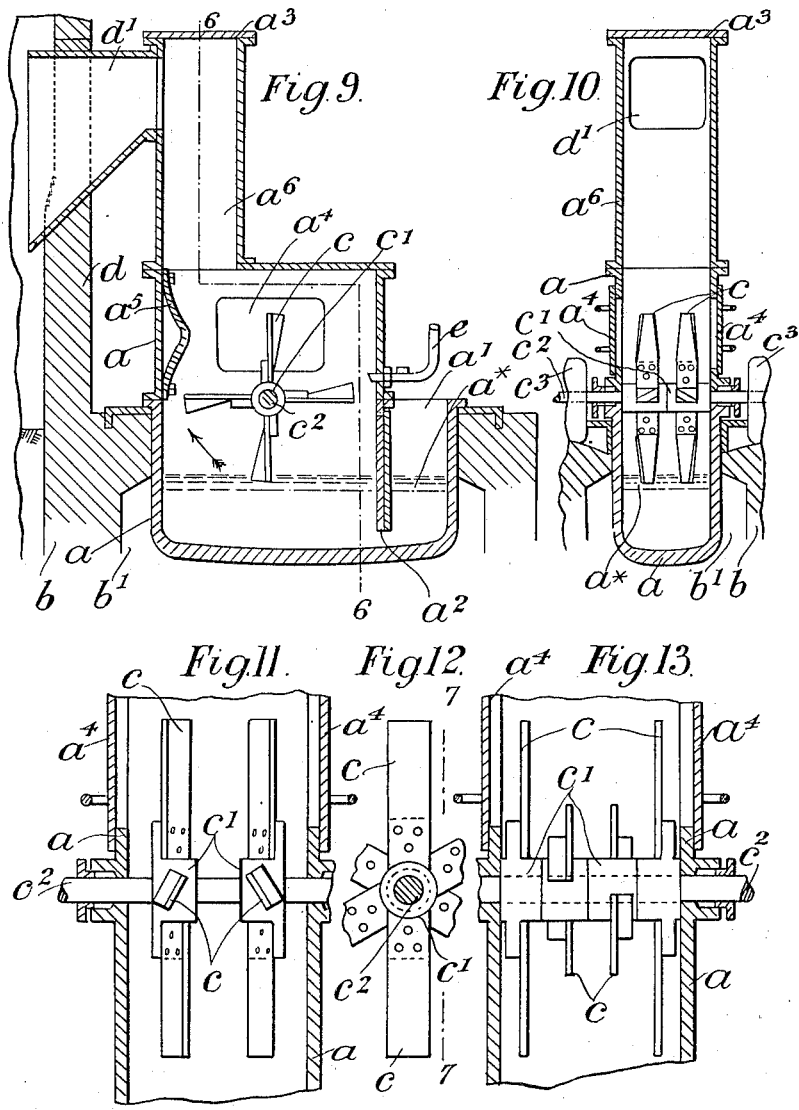
WITNESSES:
John C. Sanders
M. B. Cottrell
INVENTOR:
William Innes,
BY
Wm. Wallace White

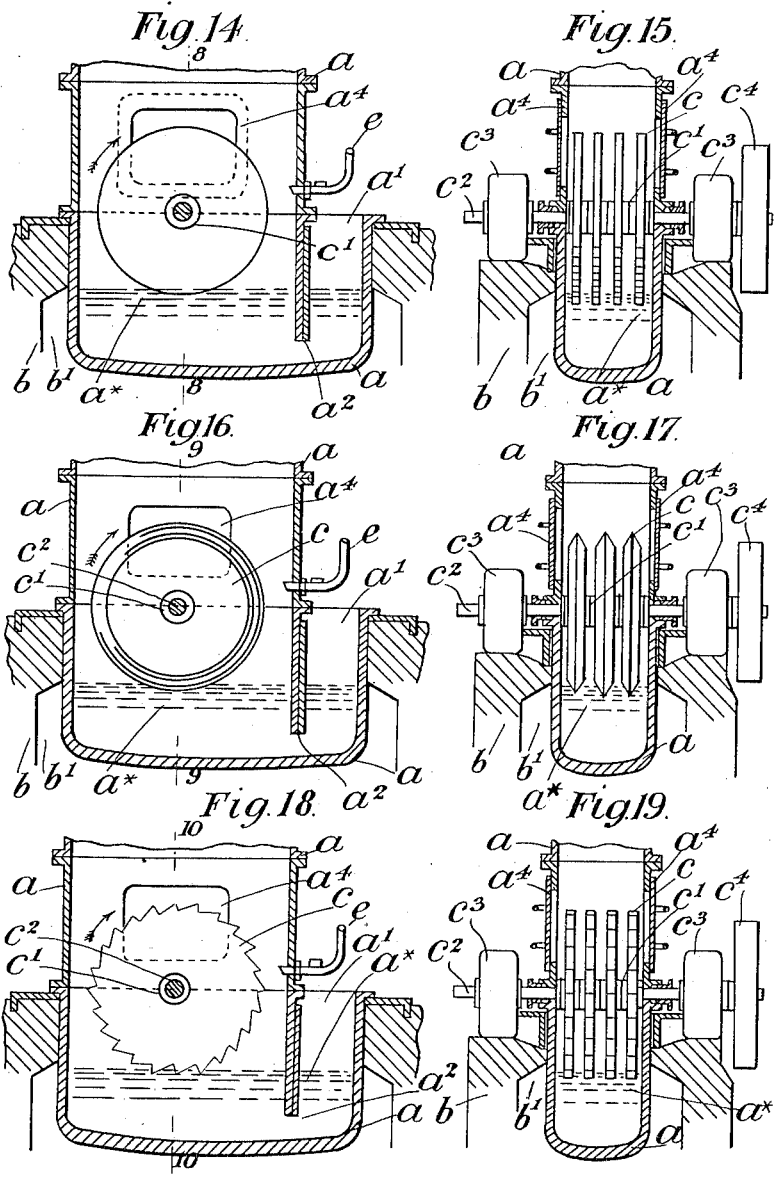

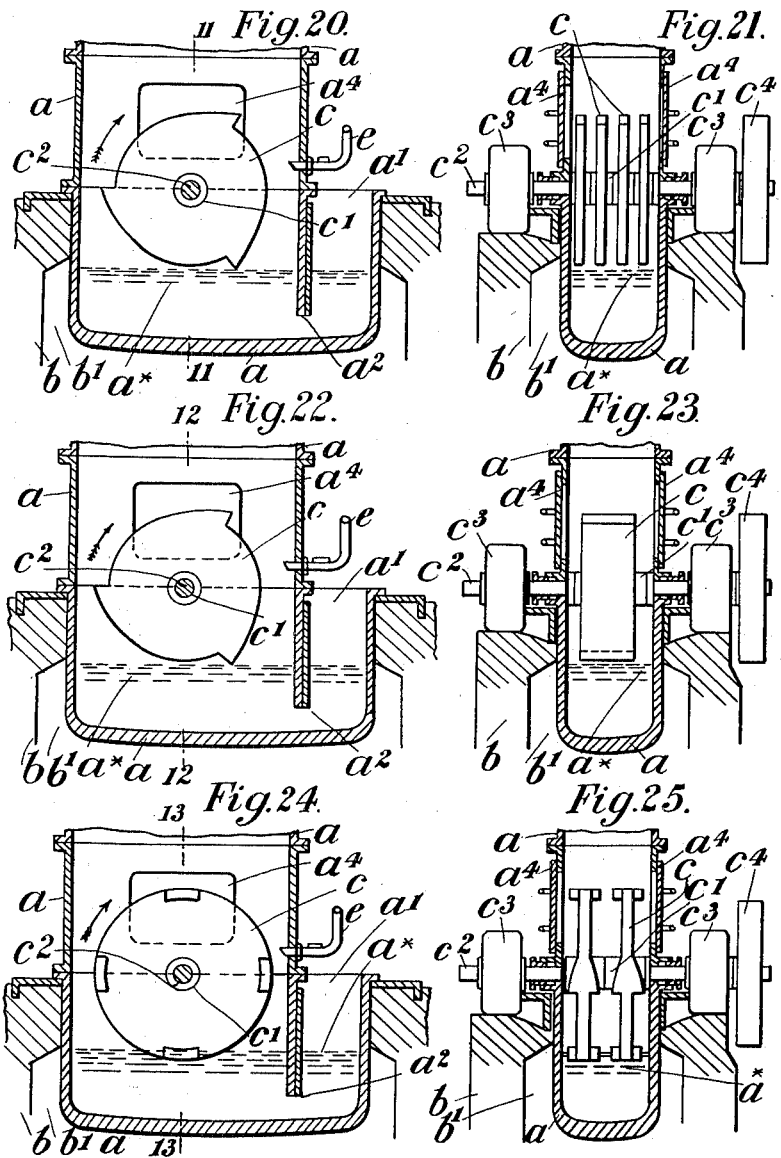

W. INNES.
APPARATUS FOR PRODUCING LEAD OXID.
APPLICATION FILED APR. 19, 1913.
1,113,123.
Patented Oct. 6, 1914.
10 SHEETS—SHEET 8.
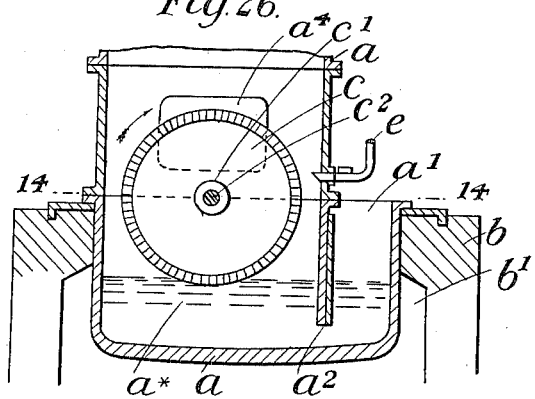
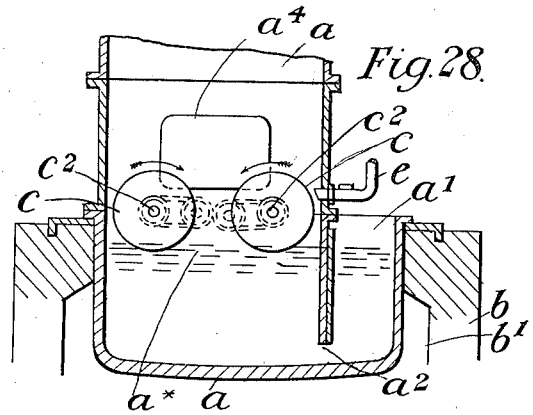
WITNESSES:
John C. Sanders
M. B. Cottrell
INVENTOR:
William Innes
BY Wallace White
ATTY.

W. INNES.
APPARATUS FOR PRODUCING LEAD OXID.
APPLICATION FILED APR. 19, 1913.

1,113,123.

Patented Oct. 6, 1914
10 SHEETS—SHEET 9.

WITNESSES:
John C. Sanders
M. B. Cottrell

INVENTOR:
William Innes
By Wm. Wallace White
ATTY.

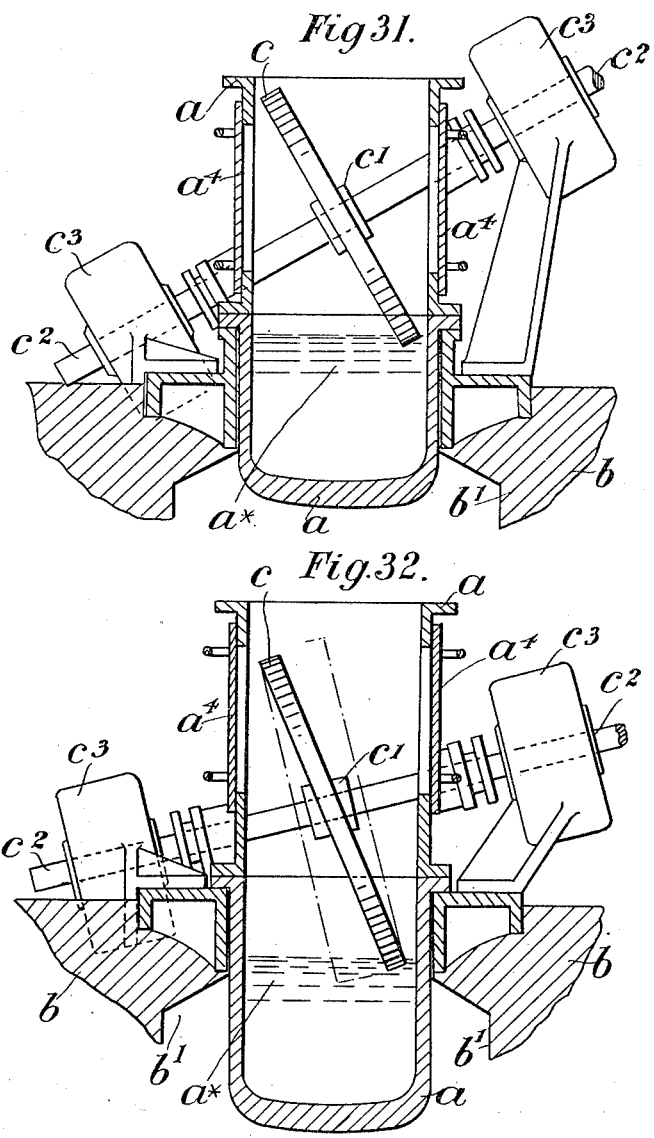

UNITED STATES PATENT OFFICE.

WILLIAM INNES, OF LIVERPOOL, ENGLAND.

APPARATUS FOR PRODUCING LEAD OXID.

1,113,123.  Specification of Letters Patent.  Patented Oct. 6, 1914.

Application filed April 19, 1913. Serial No. 762,280.

*To all whom it may concern:*

Be it known that I, WILLIAM INNES, a subject of the King of Great Britain, residing at 114 Carisbrooke road, Walton, Liverpool, in the county of Lancaster, England, have invented certain new and useful Apparatus for Producing Lead Oxid, of which the following is a specification, reference being had to the drawings hereunto annexed and to the figures and letters marked thereon—that is to say:

The invention relates to that class of apparatus heretofore employed which consists of a circular covered pot into which metallic lead is poured through a siphon and maintained in a fluid condition by a furnace beneath the pot. This class of pot is provided with an outlet and with a baffle plate or curtain near to the outlet while a horizontal paddle or stirrer is arranged near to the bottom of the pot and is rotated in such manner that it dashes the metallic lead against the baffle plate or curtain whereby the lead becomes atomized. A blast of heated air or steam or both is forced into the pot and the atomized lead coming into contact with it becomes oxidized and is carried away by the blast through a heated uptake or other heated channel to a collecting chamber. There are certain disadvantages connected with this process among them being that no means are provided for ascertaining the depth of metallic lead in the pot so that it is difficult to know when the pot requires recharging. Should the pot become empty there is great risk of burning the bottom of the pot while on the other hand overcharging would be liable to choke the pot and bend the paddle or stirrer while the quantity of molten lead within the pot at all times is necessarily so small that if the working of the pot were stopped from any cause the tendency would be for the lead and oxid within the pot at that time to settle on the bottom of the pot and fuse. Furthermore, the metallic lead and also the oxid which are caused by the splashing of the paddles of stirrers to accumulate on the inside of the pot and its cover are liable to fall suddenly and either choke the pot or bend the stirrers or fall to the bottom of the pot and fuse there to the injury of the pot while inasmuch as it is a necessity of the system to maintain only a small depth of metallic lead in the pot the bottom of the pot is liable to speedily burn through.

Now the object of the present invention is by a simple arrangement of parts to remove these disadvantages.

Figure 2:
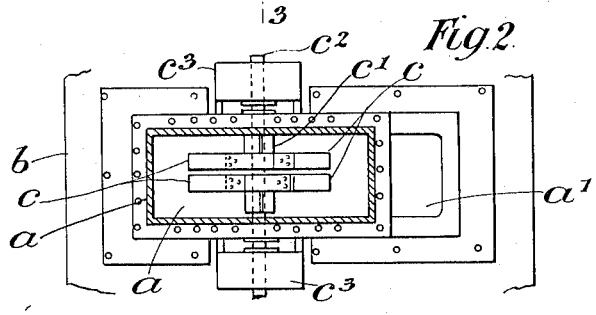
Figure 29:
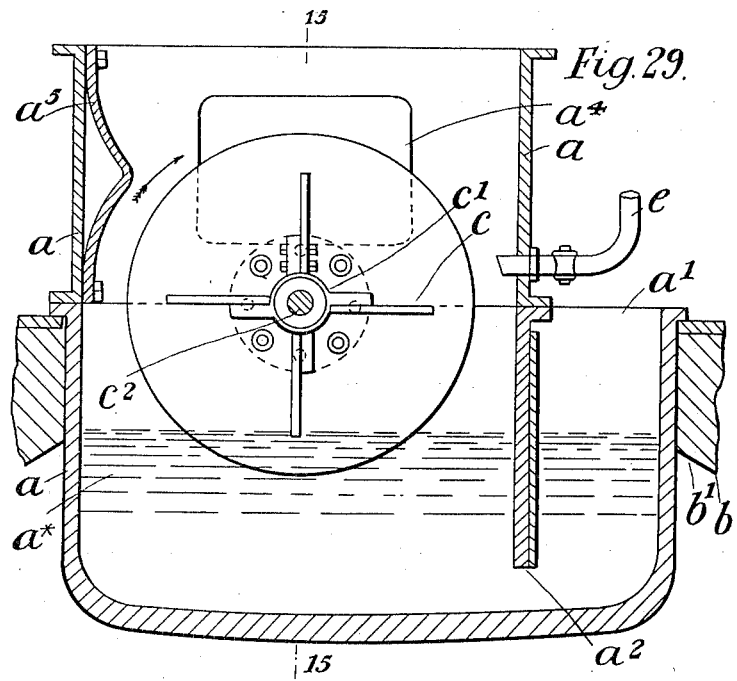
Figure 30:
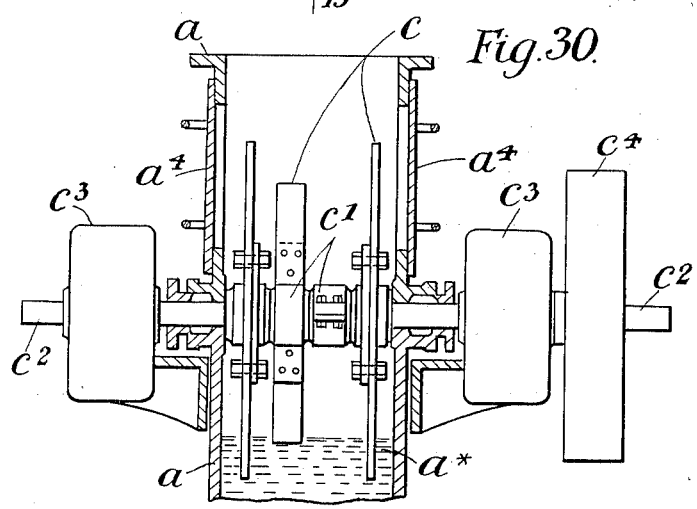

In the accompanying drawings:—Figure 1 is a vertical section taken on the line 1—1 of Fig. 3 of an apparatus for the production of lead oxid constructed according to the present invention, the pot being formed oblong in horizontal section. Fig. 2 is a horizontal section taken on the line 2—2 of Fig. 1. Fig. 3 is a vertical section taken on the line 3—3 of Fig. 1. Fig. 4 is a similar view to Fig. 1 of part of the apparatus illustrating a slight modification. Fig. 5 is a similar view to Fig. 2 illustrating a means of driving the blades, paddles or stirrers in opposite directions. Fig. 6 is a plan of a pot with the cover removed illustrating the application of the invention to a circular pot. Fig. 7 is a horizontal section taken on the line 4—4 of Fig. 8 illustrating a further slight modification in the construction of the apparatus. Fig. 8 is a vertical section taken on the line 5—5 of Fig. 7. Fig. 9 is a similar view to Fig. 1 of the apparatus illustrating a further slight modification. Fig. 10 is a vertical section taken on the line 6—6 of Fig. 9. Fig. 11 is a similar view to Fig. 3 of part of the apparatus illustrating a modified form of stirrer. Fig. 12 is a similar view to Fig. 1 illustrating a further modified form of stirrer. Fig. 13 is a vertical section taken on the line 7—7 of Fig. 12. Fig. 14 is a similar view to Fig. 1 of part of the apparatus illustrating a further modified form of stirrer. Fig. 15 is a vertical section taken on the line 8—8 of Fig. 14. Fig. 16 is a similar view to Fig. 1 of part of the apparatus illustrating a further modified form of stirrer. Fig. 17 is a vertical section taken on the line 9—9 of Fig. 16. Fig. 18 is a similar view to Fig. 1 of part of the apparatus illustrating a further modified form of stirrer. Fig. 19 is a vertical section taken on the line 10—10 of Fig. 18. Fig. 20 is a similar view to Fig. 1 of part of the apparatus illustrating a further modified form of stirrer. Fig. 21 is a vertical section taken on the line 11—11 of Fig. 20. Fig. 22 is a similar view to Fig. 1 of part of the apparatus illustrating a further modified form of stirrer. Fig. 23 is a vertical section taken on the line 12—12 of Fig. 18. Fig. 24 is a similar view to Fig. 1 of part of the apparatus illustrating a further modified form of stirrer. Fig. 25 is a vertical section taken on the line 13—13 of Fig. 24. Fig. 26 is a similar view to Fig. 1 of part of the apparatus illustrating a further modified form of stirrer. Fig. 27 is a part horizontal section taken on the line 14—14 of Fig. 26. Fig. 28 is a similar view to Fig. 1 of part of the apparatus illustrating a modified arrangement of stirrers. Fig. 29 is a similar view to Fig. 1 of part of the apparatus illustrating a further modified form of stirrer. Fig. 30 is a vertical section taken on the line 15—15 of Fig. 29. Fig. 31 is a similar view to Fig. 3 illustrating a further slight modification and Fig. 32 is a similar view illustrating a still further modification.

In the several figures like parts are indicated by similar letters of reference and Figs. 4, 5 and 11 to 13, 29, 30, 31 and 32 are drawn to an increased scale and Fig. 27 is drawn to a further increased scale with respect to the other figures of the drawings.

Referring to Figs. 1 to 3, $a$ represents an oxid pot which is of considerable height and provided with a cover $a^3$, which may be made removable if desired, and with manholes closed by covers $a^4$ designed to facilitate the cleaning out of the pot when required and $a'$ represents a well or supplemental pot arranged at the side or end of the pot $a$ and connected therewith by a way or neck $a^2$. $b$ represents brickwork in which the pot is set and $b'$ represents a furnace which serves to maintain the metallic lead $a^*$ in the pots $a$ $a'$ in the necessary fluid condition. $c$ represents the blades of the paddles or stirrers, which blades are fixed to the spokes of star shaped wheels or bosses $c'$ fixed upon a shaft $c^2$ mounted in bearings carried by pedestals $c^3$ mounted on the brickwork $b$ and these pedestals may contain oil wells for lubricating the bearings, and which feature is well known, and the shaft $c^2$ has fixed thereon a pulley $c^4$ adapted to receive a strap or belt (not shown) by means of which the shaft $c^2$ may be driven from any suitable source of power.

The blades, paddles or stirrers $c$ instead of being mounted on a vertical shaft and disposed horizontally near to the bottom of the pot $a$ as heretofore are, according to the present invention, fixed on a horizontal shaft $c^2$ so that in their revolution the blades, paddles, or stirrers $c$ dash the fluid metallic lead $a^*$ against the side or end of the pot $a$ thereby atomizing or sub-dividing it and thus the wall of the pot $a$ fulfils the office of the baffle plate or curtain heretofore employed.

The form of pot $a$ it is preferred to employ in conjunction with the vertically disposed blades, paddles or stirrers $c$ is a pot of oblong shape in horizontal section, as shown more particularly in Fig. 2, although it might be used with a circular or other pot but perhaps not with the same advantage. The side walls of the oblong section pot receive any particles of metallic lead which may be laterally thrown by the blades, paddles or stirrers and insure its more or less complete atomization or subdivision.

The blades, paddles or stirrers $c$ are arranged at such an elevation and the blades are of such dimensions that in their revolution the tips of said blades do not descend below a point some distance above the bottom of the pot and it is thus possible to maintain a considerable depth of molten metallic lead in the pot $a$. By reason of this considerable depth of molten metallic lead there is less liability for the bottom of the pot $a$ to burn out while in the event of a fall of accumulations from the cover or sides of the pot said accumulations will be received by the body of molten lead and will float there instead of falling onto the bare bottom of the pot and fusing there as heretofore and possibly bending the blades of the stirrers.

The level of the molten metallic lead maintained in the oxid pot $a$ should be such that in the revolution of the blades, paddles or stirrers $c$ the tips of said blades in turn dip into or are submerged in the molten metallic lead $a^*$ to only a slight extent and it is found in practice that by rotating the blades, paddles or stirrers $c$ at a suitable speed the body of molten lead is considerably agitated and molten lead and dross are dashed against the walls of the pot $a$ and broken up thereby sub-divided or atomized so that the heated air or the like is enabled to more fully act upon the same.

In order to constantly maintain the required degree of immersion of the tips of the blades, paddles or stirrers $c$ or otherwise their relation to the molten lead or dross it is desirable to regulate the feeding of lead to the oxid pot $a$ more accurately than could be done by supplying it through a siphon as heretofore. In order to accomplish this the supplemental pot or well $a'$ is provided at the side or end of the oxid pot $a$ and connected with the latter by a way or neck $a^2$ or it might be by a pipe as hereinafter described, and said way or neck $a^2$ is arranged at a level below that at which it is desired to maintain the molten lead in the oxid pot $a$ so that the way or neck $a^2$ is sealed by the molten lead $a^*$ and the lead necessary to maintain the required level in the oxid pot $a$ is fed into the supplemental pot $a'$ either in a molten state or in the form of pigs and melted therein. The level of the molten lead $a^*$ being equal in both pots $a$ $a'$ it is only necessary to ascertain the proper working level in the oxid pot $a$ whereupon the feeding of the lead to the supplemental pot $a'$ may be easily regulated so as to maintain the required working level in the oxid pot $a$. As the way or neck $a^2$ connecting the oxid pot $a$ with the supplemental pot $a'$ is below the working level of the molten lead in both pots a perfect seal is obtained which prevents dust blowing back from the oxid pot $a$ into the supplemental pot $a'$ and so into the atmosphere.

In some cases the paddles or stirrers may be so arranged as to flick the dross from the surface of the molten lead.

A collecting chamber $d$ is arranged at the side of the oxid pot $a$ and is connected therewith by a way $d'$.

A blast of air, preferably heated, or air and steam, either or both, is introduced into the oxid pot $a$ at any suitable level through a horizontal pipe $e$ and the atomized or subdivided lead is carried upward thereby and by reason of the height of the pot or from other causes and wholly or in part becomes oxidized while in suspension, the metallic particles if any being separated by gravitation and the cloud of oxid is carried by the blast through the way $d'$ into the collecting chamber $d$. Or the oxid might be carried through a heated uptake or upcast shaft such as $a^6$ shown in Fig. 9 as has heretofore been proposed or through other oxidizing means on its way to the collecting chamber $d$.

In the example given at Fig. 4 the pot $a$ is shown to be provided with a device adapted to receive the impact of the molten lead dashed against the wall of the pot $a$ by the blades, paddles or stirrers $c$ and thus relieve the same of the principal wear. This device consists of a cast steel plate $a^5$ which may be of V-shaped formation in cross section and slightly hollowed as shown or of other suitable shape and bolted to the end wall of the pot $a$ so that it may be easily renewed from time to time as occasion may demand.

In the example given at Fig. 5, is illustrated a modification wherein two sets of blades, paddles or stirrers $c$ are arranged to work in opposite directions. The blades $c$ of one paddle or stirrer are carried by a star shaped boss $c'$ similar to that described with respect to the previous figures fixed upon a solid shaft $c^2$ and the blades $c^*$ of the other paddle or stirrer are carried by a star shaped boss $c^{*\prime}$ fixed upon a hollow shaft $c^{*2}$ surrounding the shaft $c^2$. Fixed upon the ends of the shafts $c^2$ $c^{*2}$ respectively are miter wheels $c^{2*}$ and $c^{*3}$ with which meshes a miter wheel $c^5$ fixed upon the end of a shaft $c^6$ carrying the driving pulley $c^4$. $c^7$ represents a bearing for the end of the solid shaft $c^{*2}$ and $c^9$ represents bearings for the shaft $c^6$. By this arrangement the blades, paddles or stirrers $c$ $c^*$ are caused to turn in opposite directions and consequently to dash the molten lead against opposite sides or ends of the oxid pot $a$ with an increased effect as regards the output of oxid but obviously with a slightly increased expenditure of power for driving.

In the example given at Fig. 6 an oxid pot is shown of circular instead of oblong horizontal section.

In the example given at Figs. 7 and 8 a modification is illustrated in which the supplemental pot $a'$ is formed separate from the oxid pot $a$ and connected therewith at a suitable elevation by a pipe or neck $a^2$ but the effect in maintaining the level of the molten lead in the oxid pot $a$ is similar to that hereinbefore described with respect to Figs. 1 to 3. The introduction of steam and heated air either or both is effected by means of an angularly disposed nozzle $e$ into which are led a steam pipe $e'$ and an air pipe $e^2$ supplied from any suitable sources.

In the example given at Figs. 9 and 10 instead of forming the oxid pot $a$ of considerable height in order to bring about the oxidation or separation of the atomized or sub-divided lead while in suspension, the same effect is obtained by the employment of a low pot provided with an upcast shaft $a^6$ up which the oxid is carried on its way to the settling or collecting chamber $d$ while if desired the upcast shaft $a^6$ may be heated in any suitable manner. In this example also the blades $c$ of the paddles or stirrers are axially twisted or set at an angle in order to modify their effect upon the molten lead within the pot $a$.

In the example given at Fig. 11 the angle of the blades $c$ is further increased so that the planes of their faces are nearly at right angles to the shaft $c^2$ on which they are fixed. In the example given at Figs. 12 and 13, this principle is further accentuated until the planes of the faces of the blades $c$ assume a position at right angles to the shaft $c^2$ so that looking at them from the side they have the appearance of a disk with gaps therein. The blades $c$ may be provided with teeth or projections on their sides or edges.

In the example given at Figs. 14 and 15 the blades or stirrers $c$ take the form of actual plain disks, their centrifugal effort serving to throw the molten lead against the wall of the pot $a$ and to agitate the body of metal.

In the example given at Figs. 16 and 17 a similar device is shown except that the disks and stirrers $c$ are formed with V shaped peripheral edges.

In the example given at Figs. 18 and 19, the peripheral edges of the disks or stirrers $c$ are shown to be formed with ratchet like teeth or projections designed to pick up the molten lead and dash it against the walls of the pot in a more positive manner.

In the example given at Figs. 20 and 21 a similar construction of disks or stirrers is shown but in this case the peripheral teeth or projections are fewer in number and more pronounced in size.

In the example given at Figs. 22 and 23 the several disks of the former example are replaced by a single broad disk or drum $c$ having broad teeth or projections extending across its periphery.

In the example given at Figs. 24 and 25 two, or there might be more than two, disks $c$ are shown having teeth or projections on their sides or faces arranged at or near their peripheries the object being the same as that hereinbefore referred to namely to agitate the lead and pick up some of it and dash it against the walls of the pot.

In the example given at Figs. 26 and 27 the disks $c$ are formed with continuous rims having a conical or tapered cross section and provided with ratchet like teeth on their side edges and said teeth may be of gradually increasing depth. By this construction of disk and by regulating the level of the molten lead in the pot $a$ the area of the surface of the toothed disk acting on the molten lead may be varied as desired.

In the example given at Fig. 28 two sets of disks, paddles or stirrers are shown to be mounted on parallel shafts $c^2$ the distance apart of which may be arranged as desired and the shafts and therefore the stirrers may be driven in the same or opposite directions as may be desired.

In the example given at Figs. 29 and 30 a further modification is shown in which blades $c$ of the character herein first shown and described are combined with disks $c$ of a diameter greater than the length of the blades and designed to dip deeper into the molten lead.

In the example given at Fig. 31 is illustrated a modification in which a disk $c$ or it might be any other suitable form of paddle or stirrer is mounted at right angles to an angularly disposed or inclined shaft $c^2$.

In the example given at Fig. 32 is illustrated a slight modification of the device shown and described with reference to Fig. 31. In this case the shaft $c^2$ is also inclined but the disk, paddle or stirrer is mounted in an inclined or angular position with relation to the shaft, the effect of which is to produce a wabbling motion of the disk $c$ or the like as shown by the dotted lines.

The axis or axes of the blades, paddles, disks or stirrers may be arranged in a horizontal position or positions or in any desired position other than vertical so that said blades, paddles, disks or stirrers assume a vertical position or positions or any other suitable position or positions other than horizontal and if desired the blast may be induced by suction or exhaustion and in this specification and claims the term blast is intended to include both methods.

The successful output of the pot is dependent on the height of the pot, the action and degree of acting surface or immersion of any of the blades, paddles, disks or stirrers, the speed at which the stirrers are driven and the rate at which the pot is fed all of which features must be proportioned and regulated according to circumstances.

By the means hereinbefore described the disadvantages connected with the oxid producing apparatus heretofore employed are avoided and at the same time the productive capacity of the plant is increased.

Having now particularly described and ascertained the nature of the said invention and in what manner the same is to be performed I declare that what I claim is:—

1. In apparatus for the production of lead oxid, in combination, a pot adapted to contain the metallic lead, means for maintaining the lead in a molten state, a rotatable stirrer in said pot, the axis of said stirrer being above the bath and forming an angle with the vertical, and the blades thereof engageable with the lead to throw the same upward to atomize it, and means for rotating said stirrer.

2. In apparatus for the production of lead oxid, in combination, a pot adapted to contain the metallic lead, means for maintaining the lead in a molten state, a rotatable stirrer in said pot, the axis of said stirrer being above the bath and horizontal and the blades thereof engageable with the lead to throw the same upward to atomize it, and means for rotating said stirrer.

3. In apparatus for the production of lead oxid, in combination, a pot adapted to contain the metallic lead, means for maintaining the lead in a molten state, a rotatable stirrer in said pot, the axis of said stirrer being above the bath and forming an angle with the vertical and the blades dipping into the lead to throw the same upward and atomize it, means for rotating said stirrer, and means for maintaining a constant level of the lead within the pot.

WILLIAM INNES.

Witnesses:
 WILLIAM PRINGLE,
 RICHARD WARBRICK GELDART.